United States Patent [19]

Blount

[11] 4,243,757

[45] Jan. 6, 1981

[54] PROCESS FOR THE PRODUCTION OF ALKALI METAL-CELLULOSE-SILICATES AND THEIR REACTION PRODUCTS

[76] Inventor: David H. Blount, 5450 Lea St., San Diego, Calif.

[21] Appl. No.: 112,290

[22] Filed: Jan. 15, 1980

Related U.S. Application Data

[62] Division of Ser. No. 29,202, Apr. 12, 1979, Pat. No. 4,220,757.

[51] Int. Cl.$^3$ .................................................. C08J 9/00
[52] U.S. Cl. ...................................... 521/154; 260/9; 260/37 N; 521/155; 528/10; 528/31; 528/425; 536/30; 536/32; 536/43; 536/44; 536/56; 536/84; 536/111
[58] Field of Search ................... 260/9, 37 N; 536/32, 536/43, 44, 30; 528/10, 31; 521/154, 155

[56] References Cited

U.S. PATENT DOCUMENTS

| | | | |
|---|---|---|---|
| 2,030,738 | 2/1936 | Bley | 528/10 |
| 4,100,112 | 7/1978 | Blount | 260/185 |
| 4,125,703 | 11/1978 | Blount | 528/95 |
| 4,129,696 | 12/1978 | Markusch et al. | 521/154 |
| 4,185,147 | 1/1980 | Blount | 521/130 |

Primary Examiner—Morton Foelak

[57] ABSTRACT

Small particles of cellulose-containing plants, fine granular oxidated silicon compounds and an alkali metal hydroxide are mixed, then heated to 150° C. to 220° C. while agitating until the plant particles soften or melt, thereby producing an alkali metal cellulose silicate condensation product.

5 Claims, No Drawings

PROCESS FOR THE PRODUCTION OF ALKALI METAL-CELLULOSE-SILICATES AND THEIR REACTION PRODUCTS

CROSS-REFERENCE TO RELATED APPLICATIONS

This application is a divisional of U.S. patent application Ser. No. 29,202, filed on Apr. 12, 1979; now U.S. Pat. No. 4,220,757.

BACKGROUND OF THE INVENTION

This invention relates to a novel and economical process to break down particles of cellulose-containing plants into smaller polymers and compounds, and in the process, they react with the oxidated silicon compounds which are highly reactive chemically and are soluble in water and/or common organic solvents.

This process requires temperatures high enough to melt the solid alkali metal hydroxide in order for it to react with the cellulose-containing plants and oxidated silicon compounds. It is not necessary to remove the lignin from wood in the process of this invention. When an organic or inorganic acid compound is added to the alkali metal-cellulose-silicate condensation product, carbon dioxide is given off. This carbon dioxide may be used to produce foamed products. The alkali metal-cellulose-silicate condensation product is a dark brown, solid product which softens at about 150° C. and becomes a thick liquid between 150° C. to 200° C.

When wood is used as the cellulose-containing plant, the usual lignin-cellulose bond is not broken in most cases, but the molecules of cellulose are broken down into smaller molecules and react with the oxidated silicon compounds to produce alkali metal-cellulose-silicate condensation products. These condensation products are highly reactive chemically, especially with aldehydes, furan compounds, polyisocyanates, polyurethane prepolymers, polyisocyanate silicate prepolymers, isocyanates, ketones, vinyl acetate, acrylic acid monomers, allyl halides, polyfunctioning alkylating agents, monofunctional alkylating agents, acrylic acid compounds with other vinyl monomers, epihalohydrins with polyamines, sulfur, silicon halides, organic polyhalides and polyamines, furfuryl alcohol, compounds which contain halogen atoms capable of being quaternized or R-SO$_2$-groups, epoxide compounds, aldehydes and phenols, aldehydes and amino compounds, vinyl acetate with other vinyl monomers, halohydrins and mixtures thereof.

An aqueous solution of the alkali metal-cellulose-silicate condensation product may be used commercially to react with polyisocyanates, isocyanate-terminated polyurethane prepolymers, polyisocyanate silicate prepolymers and isocyanate-terminated polyurethane silicate prepolymers. The aqueous solution of the alkali metal-cellular-silicates may produce novel and useful products by being polymerized with aldehydes, furfuryl alcohol, halohydrins, epihalohydrins and polyamines, ketones, organic epoxides, vinyl monomers, allyl halides, organic polyhalides, organic halides, organic acid sulfates, organic poly(acid sulphates), organic nitrates, organic polynitrates, organic acid phosphates, organic poly(acid phosphates), organic bicarbonates, organic poly(bicarbonate compounds containing radicals), organic compounds containing formate radicals, organic compounds containing poly(formate) radicals, organic compounds containing acetate, propionate laurate, oleate, stearate, oxalate, acid malonate, acid tartrate, acid citrate radical and mixtures thereof, sulfur and mixtures thereof.

The water-soluble alkali metal-cellulose-silicate condensation product may be precipitated by the addition of a salt-forming compound, such as an organic or inorganic acid. The water is filtered off. The water contains 5% to 30% by weight of water-soluble cellulose-containing plant polymers; these may be recovered by evaporating the water. The precipitated cellulose-silicate condensation product is in the form of dark brown to black-colored fine particles which are soluble in acetic acid, alcohols, dilute alkali hydroxide solutions and other organic solvents.

The cellulose-silicate reaction product will react chemically with isocyanate compounds, polyisocyanate compounds, polythiocyanates, thiocyanates, polyurethane prepolymers, polyisocyanate silicate prepolymers, polyurethane silicate prepolymers, silicon halides, polycarboxyl acids and their corresponding anhydrides, organic epoxides, aldehydes, ketones, furfuryl alcohol, epihalohydrins and mixtures thereof.

At least 3 components are used to produce alkali metalcellulose-silicate condensation product such as:
Component A: Cellulose-containing plants;
Component B: Oxidated silicon compound;
Component C: Alkali metal hydroxide.

Component A

Any suitable cellulose-containing plant or the products of cellulose-containing plants which contain cellulose may be used in this invention. The plant material is preferred to be in the form of small particles such as sawdust. In nature, cellulose is widely distributed. It is found in all plants, and they may be used in this process, preferably in a dry, small-particle form.

Suitable cellulose-containing plants include, but are not limited to, trees, e.g., spruce, pine, hemlock, fir, oak, ash, larch, birch, aspen, poplar, cedar, beech, maple, walnut, eypress, redwood, cherry, elm, chestnut, hickory, locust, sycamore, tulip, tupelo, butternut, apple, alder, magolia, dogwood, catalpa, boxwood, crabwood, mahogany, lanewood, letterwood, mora, prima vera, purpleheart, rosewood teak, satinwood, mangrove, wattle, orange, lemon, logwood, fustic, osageorgane, sappanwood, Brazilwood, barwood, camwood, cottonwood, sandalwood, rubber, gutta, and mesquite; shrubs, e.g., oleander, cypress, junipers, acanthus, pyracantha, lugustrum, lantana, bougainvilla, azalea, feijoa, ilex, fuchsia, hibiscus, datura, holly, hydrangea, jasmine, eucalyptus, cottoneaster, xylosma, rhododendron, castor bean, eugenia, euonymus, fatshedera, aralia, etc.; agricultural plants, e.g., cotton, cotton stalks, corn stalks, corn cobs, wheat straw, oat straw, rice straw, can sugar (bagasse), soybean stalks, peanut plants, pea vines, sugar beet waste, sorghum stalks, tobacco stalks, maize stalks, barley straw, buckwheat straw, quinoa stalks, cassova, potato plants, legume vines and stalks, vegetable (inedible portion), etc.; weeds, grasses, vines, kelp, flowers, algae and mixtures thereof. Wood fibers and cotton fibers are the preferred cellulose-containing materials. The waste products of agricultural plants may be air-dried, then ground into small particles and used in this invention. Commercial waste products containing cellulose, e.g., paper, cotton cloths, bagasse wallboard, wood products, etc., may be used in this invention. Wood with the lignin removed (wood pulp) may be used in this invention. Cellulose-containing plants which have been partially decomposed, such as humus, peat and certain soft brown coal may be used in this invention.

Other products of plants may be recovered in the process of this invention such as waxes, gums, oils, sugars, alcohols, agar, rosin, turpentine, resins, rubber latex, dyes, etc.

Component B

Any suitable oxidated silicon compound may be used in this invention. Suitable oxidated silicon compounds include silica, e.g., hydrated silica, hydrated silica containing Si-H bonds(silicoformic acid), silica gel, silicic acid, silica, etc.; alkali metal silicates, e.g., sodium silicate, potassium silicate, lithium silicate, etc., natural silicates with free silicic groups and mixtures thereof.

Silica is the preferred oxidated silicon compound.

Component C

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The alkali metal-cellulose-silicate condensation product may be reacted with inorganic acids, e.g., sulfuric acid, hydrochloric acid, nitric acid, phosphoric acid, sulphorous acid, hypophosphorous acid, fluoroboric acid, etc.; organic acid, e.g., acetic acid, propionic acid, glycolic acid, lactic acid, succinic acid, tartaric acid, oxalic acid, phthalic acid, trimellitic acid, and the like; phosphinic acid, phosphonous acid, phosphonic acid, amidosulphonic acid, et.; inorganic hydrogen-containing salts e.g., sodium hydrogen sulphate, potassium hydrogen sulphate, sodium dihydrogen phosphate, potassium dihydrogen phosphate and the like, to product cellular solid cellulose-silicate products. Carbon dioxide is released in the reaction to produce air cells in the cellulose-silicate products. Further examples of acids may be found in German Pat. No. 1,178,586 and in U.S. Pat. No. 3,480,592, and these acids may be used in this invention.

The acid compounds may also be used to react with the alkali metal atoms in the alkali metal-cellulose-silicate condensation product to produce a salt and also release $CO_2$ which expands the cellulose-silicate and the cellulose-silicate reaction products into cellular solid products. The acid compounds may also be used as a catalyst in the reactions to produce foamed aminoplast-cellulose-silicate solid products, foamed phenoplast-celluose-silicate solid products, aldehyde-celluose-silicate cellular solid products, polyurethane-cellulose-silicate cellular solid products and cellulose-silicate cellular products.

Any suitable aldehyde may be used in this invention, such as formaldehyde, acetaldehyde, butyl aldehyde, chloral, acrolein, furfural, benzaldehysde, crotonaldehyde, propionaldehyde, pentanals, hexanals, heptanals, octanals and their substitution products, semi-acetals and full acetals, paraformaldehdye and mixtures thereof. Compounds containing active aldehyde groups such as hexamethylene tetramine may also be used to produce aldehyde-cellulose-silicate cellular solid or solid reaction products.

Any suitable amino compound may be used in this invention to produce aminoplast-cellulose-silicate reaction products such as urea, thiourea, alkyl-substituted thiourea, alkyl-substituted ureas, melamine, aniline, quanidine, saccharin, dicyandiamide, benzene sulfonamides, toluene sulfonamide, aliphatic and aromatic polyamines and mixtures thereof. Urea is the preferred amino compound, and formaldehyde is the preferred aldehyde when used with amino compound.

Any suitable phenol compound may be used in this invention to produce phenoplast-cellulose-silicate cellular solid or solid reaction products such as phenol, p-cresol, o-cresol, m-cresol, cresylic acid, xylenols, resorcinol, chashew nut shell liquid, anacrodol, p-tert-butyl phenol, Bisphenol A, creosote oil, 2,6-dimethylphenol and mixtures thereof. Phenol is the preferred phenol compound and formaldehyde is the preferred aldehyde when used with a phenol compound.

Any suitable mixture of the amino compounds and phenol compounds with an aldehyde may be used in this invention to produce aminoplast-phenoplast-cellulose-silicate solid or cellular solid products.

Any suitable organic polyisocyanate may be used according to the invention, including aliphatic, cycloaliphatic, araliphatic, aromatic may be employed in the process of the invention are emeplified by the organic diisocyanates which are compounds of the general formula:

where R is a divalent organic radical such as an alkylene, aralkylene or arylene radical. Such suitable radicals may contain, for example, 2 to 20 carbon atoms. Examples of such diisocyanates are:

tolylene diisocyanate
p,p'-diphenylmethane diisocyanate (sic)
phenylene diisocyanate
m-xylylene diisocyanate
chlorophenylene diisocyanate
benzidene diisocyanate
naphthylene diisocyanate
decamethylene diisocyanate
hexamethylene diisocyanate
pentamethylene diisocyanate
tetramethylene diisocyanate
thiodipropyl diisocyanate
propylene diisocyanate
ethylene diisocyanate Other polyisocyanates, polyisothiocyanates and their derivatives may be equally employed. Fatty diisocyanates are also suitable and have the general formula

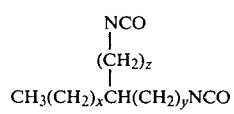

where $x+y$ totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethyleneisocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides. Phosgenation on the nucleus, with aldehydes or ketones may be used in this invention. Solutions of distillation residues accumulating during the production of tolylene diisocyanates, dihenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4-; and methylene-bis-(cyclohexyl-4,4') diisocyanate may be used in this invention. Suitable polyisocyanates which may be used according to the invention are described, e.g., by W. Siefkin in Justus Liebigs Annalen derChemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethaneprepolymers and then also used in this invention.

Reaction products of from 50 to 99 mols of aromatic diisocyanates with from 1 to 50 mols of conventional organic compounds with a molecular weight of, generally, from about 200 to about 10,000, which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and 1,3-glycol; butylene-1,4- and -2,3-glycol; hexane-1,6-diol; octane-1,8-diol; neopentyl glycol, cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylgrycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide propylene oxide, butylene oxide, tetrahydrofurane oxide, styrene oxide or epichlorohydrin, each with itself, e.g., in the presence of $RF_3$, or by addition of these epoxides, optionally as mixtures or successively, to starting components which contain reactive hydrogen atoms such as alcohols or amines, e.g., water, ethylene glycol; propylene-1,3- or 1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 6 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains MCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

When an aqueous solution of alkali metal cellulose silicate is being used to react with, or as a curing agent for, polyisocyanates, and in certain cases where the alkali metal cellulose silicate is reacting with polyisocyanates, it is advantageous to use activators (catalysts) such as tertiary amines, e.g., triethylamine, tributylamine, N-methyl morpholine, N-ethyl morpholine, tetramethylenediamine, pentamethyldiethylenetriamine, triethanolamine, triisopropanolamine, organo-metallic compound, e.g., tin acetate, tin oxtoate, tin ethyl hexoate, dibutyl tin diacetate, dibutyl tin dilaurate and mixtures thereof.

Other examples of catalysts which may be used according to the invention and details of their action are described in Kinstoff-Handbuch, Volume VII, published by Vieweg and Hochtlen, Carl-Hauser-Verlag, Munich, 1966, on pages 96 and 102. Silaamines are suitable catalysts, e.g., 2,2,4-trimethyl-2-silamorpholine or 1,3-diethyl aminoethyltetramethyl disiloxane. Suitable catalysts are also tetraalkyl ammonium hydroxides, alkali phenolates, alkali metal hydroxides, alkali alcoholates and hexahydrotriazines.

Suitable flame-resistant compounds may be used in the products of this invention such as those which contain halogen or phosphorus, e.g., tributylphosphate; tris(2,3-dichloropropyl)phosphate; polyoxypropylenechloromethylphosphonate; cresyldiphenylphosphate; tricresylphosphate; tris-(beta-chloroethyl)phosphate; tris-(2,3-dichloropropyl)-phosphate; triphenyl-phosphate; ammonium phosphate; perchlorinated diphenyl phosphate; perchlorinated terephenyl phosphate; hexabromocyclodecane; tribromophenol; dibromopropyldiene, hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphonic acid; polyvinylchloride tetomers chloroparaffins as well as further phosphorus- and/or halogen-containing flame-resistant compounds as they are described in "Kunstsoff-Handbuch", Volume VII, Munich, 1966, pages 110 and 111, which are incorporated herein by reference. The organic halogen-containing components are, however, preferred in the polyurethane-cellulose-silicate products. In the production of aldehyde-cellulose-silicate, aminoplast-cellulose-silicate, phenoplast-cellulose-silicate cellular products, and phosphoric acid may be used to react with the alkali metal atoms, thereby producing an alkali metal hydrogen phosphate which may be used as the flame-resistant compound.

DETAILED DESCRIPTION OF THE INVENTION

The preferred process to produce the alkali metal-cellulose-silicate condensatio product is to mix about 3 parts by weight of air-dried fine particles of a plant, 1 to 2 parts by weight of an oxidated silicon compound and 2 to 5 parts by weight of an alkali metal hydroxide compound, then to heat the mixture at ambient pressure and 150° C. to 220° C. for 5 to 60 minutes, thereby producing an alkali metal-cellulose-silicate condensation product.

The alkali metal-cellulose-silicate polymer softens or melts into a thick liquid at 150° C. to 220° C. and when it cools, it forms a dark-brown solid mass. The mass is easily broken up into fine particles and is soluble in organic solvent, e.g., alcohols, polyols, epichlorohydrin, chlorohydrin, etc., and/or water.

The alkali metal-cellulose-silicate condensation product may be neutralized with an acid compound to a pH of about 7 to produce a formed cellulose-silicate product by the production of $CO_2$ when the acid reacts with the alkali metal atoms to form a salt. The foamed cellulose-silicate product may be optionally washed to remove the salts, then dried, and may be utilized for thermal- and sound-insulation material in construction of buildings, cars, boats and airplanes. The foamed cellulose-silicate may also be reacted with polyurethane and/or isocyanate-terminated polyurethane prepolymers.

In an additional preferred process, about 2 parts by weight of the alkali metal-cellulose-silicate condensation product produced by the process of the invention are mixed with 1 to 5 parts by weight of an aldehyde, then agitated at ambient temperature and pressure for 10 to 60 minutes, thereby producing an aldehyde-alkali metal-cellulose-silicate copolymer. The aldehyde-alkali metal-cellulose-silicate copolymer is then reacted with an acid compound until the pH is 6 to 7, thereby producing a formed aldehyde-cellulose-silicate copolymer. The salt is removed by washing and filtering.

In an additional preferred process, about 2 parts by weight of the alkali metal-cellulose-silicate condensation product produced by the invention are mixed with 1 to 5 parts by weight of an amino compound and 0.5 to 5 mols of an aldehyde for each mol of the amino compound, then agitated at a temperature and pressure between ambient temperature and 100° C. for 10 minutes to 12 hours, thereby producing an aminoplast-alkali metal-cellulose-silicate resin; then an acid compound is added until the pH is 5 to 7, while agitating until the mixture begins to expand, thereby producing a cellular solid aminoplast-cellular-silicate product.

In an additional preferred process, about 2 parts by weight of the alkali metal-cellulose-silicate condensation product produced by the process of this invention are mixed with 1 to 5 parts by weight of a phenol compound and 1 to 5 mols of an aldehyde per mol of the phenol compound, then agitated at a temperature from ambient to 100° C. for 10 minutes to 12 hours, thereby producing a phenoplast-alkali metal-cellulose-silicate resinous product; then an acid compound is added until the pH is 5 to 7 while agitating for a few seconds until the mixture begins to expand, thereby producing a cellular solid phenoplast-cellulose-silicate product.

The processes to produce cellular solid aminoplast-cellulose-silicate products and phenoplast-cellulose-silicate cellular solid products may be combined to produce cellular solid phenoplast-aminoplast-cellulose-silicate products.

In an additional preferred process, 1 to 4 parts by weight of the alkali metal-cellulose-silicate condensation product produced by the process of this inventio and about 3 parts by weight of an isocyanate-terminated polyurethane prepolymer are rapidly and thoroughly mixed at ambient temperature and pressure, and in a few seconds to about 120 minutes, the mixture expands 3 to 12 times its original volume to produce a cellular solid polyurethane-cellulose-silicate product.

In an additional preferred process, one part by weight of an aqueous solution containing 20% to 60% by weight of the alkali metal-cellulose-silicate product produced by the process of this invention is mixed at ambient temperature and pressure with 1 to 10 parts by weight of an organic polyisocyanate or polyisothiocyanateand the mixture is optionally heated up to 100° C.; then in a few seconds to 120 minutes, the reaction is complete, thereby producing a polyisocyanate-cellulose-silicate cellular solid or solid product.

In an additional preferred process, about 10 parts by weight of an aqueous solution containing 20% to 60% by weight of the alkali metal-cellulose-silicate condensation product as produced by the process of this invention are mixed, at ambient pressure and temperature to 100° C., with 10 to 100 parts by weight of an isocyanate-terminated polyurethane prepolymer and optionally up to 0.01 part by weight of an amine catalyst; then in a few seconds to 120 minutes, the reaction is complete, thereby producing a polyurethane-cellulose-silicate cellular or solid product.

In an additional preferred process, 1 to 3 parts by weight of the alkali metal-cellulose-silicate condensation product as produced by the process of this invention, 1 to 3 parts by weight of a polyol and 3 parts by weight of an organic polyisocyanate or polyisothiocyanate are rapidly mixed at ambient temperature and pressure; then in a few seconds to 120 minutes, the reaction is complete, thereby producing a polyurethane-cellulose-silicate cellular solid or solid product.

In an additional preferred process, 2 parts by weight of the alkali metal-cellulose-silicate condensation product as produced by the process of this invention are mixed with 1 to 4 parts by weight of an organic polyisocyanate, then agitated for 10 to 60 minutes at a temperature between 20° C. to 70° C., thereby producing a polyisocyanate-alkali metal-cellulose-silicate prepolymer; then 10% to 100% by weight of a curing agent, based on the weight of the prepolymer, is added to the prepolymer while agitating at 20° C. to 80° C. for 5 to 20 minutes, thereby producing a cellular solid or solid polyisocyanate-cellulose-silicate product.

In an additional preferred process, 1 to 3 parts by weight of the alkali metal cellulose produced by the process of this invention, 1 to 3 parts by weight of a polyol (polyhydroxyl compound) and 1 to 3 parts by weight of an organic polyisocyanate or polyisothiocyanate are rapidly and thoroughly mixed at ambient temperature and pressure, and in a few seconds to 5 minutes, the mixture begins to expand, expanding 3 to 12 times its original volume, thereby producing a tough cellular solid polyurethane-cellulose-silicate product.

When the alkali metal-cellulose-silicate produced by this invention is reacted with an acid compound, $CO_2$ is given off, and a foamed cellulose-silicate product is produced. In cases where inadequate $CO_2$ is produced to form adequately expanded cellular solid cellulose-silicate products, a blowing agent may be used. The blowing agent may be added to the alkali cellulose-silicate condensation product or to an aqueous solution of the condensation product before the acid compound is added. The blowing agent may be also added with the acid compound. The chemical reaction between the acid compound and the alkali metal atoms will usually produce enough heat to evaporate or expand the blowing agent; if necessary, an external source of heat may be used.

Readily volatile blowing agents, e.g., dichlorodifluoromethane, trichlorofluoromethane, butane, isobutylene, vinyl chloride, etc., may be used to produce cellular solid products in this invention. In addition, the liquid reaction mixtures can be expanded into a foam by the introduction of gases, optionally under pressure, such as air, $CF_4$, noble gases and $H_2O_2$, the resulting foam being introduced into the required mold and hardened therein. The resultant foam may optionally contain foam stabilizers such as surfactants, foam formers, emulsifiers, and, if desired, organic or inorganic fillers or diluents may initially be converted by blowing gas into a foam, and the resulting foam may subsequently be mixed in a mixer with the other components, the resulting mixture being allowed to harden. Instead of blowing agents, it is also possible to use inorganic or organic, finely-divided hollow bodies such as expanded hollow beads of glass, plastic, straw, expanded clay, and the like, for producing foams.

The foams obtainable in this way can be used in either their dry or their moist form, if desired, after a compacting or tempering process, optionally carried out under pressure, as insulating materials, cavity fillings, packaging materials, building materials, etc. They can also be used in the form of sandwich elements, for example, with metal-covering layers in house, vehicle and aircraft construction.

It is also possible to introduce into the foaming reaction mixtures, providing they are still free-flowing, organic and/or inorganic foamable or already foamed particles such as, for example, expanded clay, expanded glass, wood, popcorn, cork, hollow beads of plastics such as vinyl chloride polymers, polyethylene, stryene polymers or foam particles thereof or even, for example, polysulphone, polyepoxide, polyurethane, phenoplasts, aminoplasts, polyimide polymers, phenoplast silicates, aminoplast silicates, epoxy silicate polymers, polyisocyanate polymers, polyurethane silicate polymers or their reaction mixtures; the foaming mixture may be allowed to foam through interstitial spaced particles in packed volumes of these particles and, in this way, insulating materials can be produced. Combinations of expanded clay, glass or slate are especially preferred with the reaction mixture, according to the invention.

It is also possible to introduce into the foaming reaction mixtures, providing they are still free-flowing at a predetermined temperature, a blowing agent which is capable of evaporation or of gas formation at this temperature, such as, for example, a halogenated hydrocarbon. The initial liquid mixture formed can be used not only for producing uniform foams or non-uniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture, vehicle and aircraft industries.

The cellular solid products (foams) according to the invention can be added to soil in the form of crumbs, optionally in admixtures with fertilizers and plant-protection agents, in order to improve its agrarian consistency.

Since the hardened foams obtained by the process according to the invention can show considerable porosity after drying, they are suitable for use as drying agents because they can absorb water; however, they can also be charged with active substances or used as catalyst supports or as filters and absorbents.

On the other hand, the foams can be subsequently lacquered, metallized, coated, laminated, galvanized, subjected to vapor deposition, bonded or flocked in either their moist or their dry form or in impregnated form. The moldings can be further processed in their moist or their dried form, for example, by sawing, milling, drilling, planing, polishing and other machining techniques. The optionally filled moldings can be further modified in their properties by thermal after-treatment, oxidation processes, hot-pressing, sintering processes or surface melting or other consolidation processes. Suitable mold materials include inorganic and-/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonate, etc.

Fillers in the form of particulate or powdered materials can be additionally incorporated into the liquid mixtures of the foamable reactants for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc.; pieces of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black; Al-, Fe-, Cu-, Ag-powder; molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched, organic polymers including plastics and rubber waste. Of the number of suitable organic polymers, the following, which can be present, for example, in the form of powders, granulate, foam particles, beads, hollow beads, foamable or unfoamed particles, fibers, ribbons, woven fabrics, webs, etc., are mentioned purely by way of examples: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyurea, polyethers, polyurethanes, polyimides, polyamides, polysulphones, polycarbonates and, of course, any copolymers as well. Inorganic fillers are preferred.

Generally, the composite materials according to the invention can be filled with considerable quantities of fillers without losing their valuable property spectrum. The amount of fillers can exceed the amount of the reactants. In special cases, the foamed products of the present invention act as a binder for such fillers.

Basically, the production of the cellular solid products according to the invention is carried out by mixing the reactants in one or more stages in a continuously- or intermittently-operating mixing apparatus and by then allowing the resulting mixture to foam and solidify, usually outside the mixing apparatus in molds or on suitable materials. The reaction temperature required for this, which may be from 0° C. to 200° C., and preferably from 20° C. to 160° C., may be achieved either by heating one or more of the reactants before the mixing process or by heating the mixing apparatus itself or, alternatively, by heating the reaction mixture after the components have been mixed. Combinations of these or other methods of adjusting the reaction temperature may, of course, also be employed. In most cases, sufficient heat is evolved during the reaction to enable the reaction temperature to rise to values above 50° C. after the reaction or foaming has begun.

In particular, however, the process according to the invention is suitable for in situ foaming on the building site. Any hollow forms obtained by means of shuttering in the conventional way may be filled up and used for foaming in this way.

The alkali metal-cellulose silicate condensation product as produced in this invention may be pre-reacted with an aldehyde, then foamed by the addition of an acid compound. The foamed particles may be dried and used as insulation material by pouring a layer of the particles between rafters and studs in houses, buildings, etc., optionally containing flame-retardant agents.

The alkali metal-cellulose-silicate condensation product as produced in this invention may be pre-reacted with an aldehyde, then foamed by the addition of an acid compound. The foamed particles may be dried and used as insulation material by pouring a layer of the particles between rafters and studs in houses, buildings, etc.

The alkali metal-cellulose-silicate as produced in this invention may be pre-reacted with an amino compound and an aldehyde to produce a liquid amino-aldehyde-aliali metal-cellulose-silicate condensation product, then be placed in a mixing chamber, optionally adding a blowing agent, emulsifier, foam stabilizer, filler, coloring agents, flame-retardant and other additives, then be rapidly mixed with and acid compound until the pH is 5 to 6.5 and then be pumped or blown by compressed air into a mold such as a wall, ceiling, etc., while expanding, thereby producing a cellular solid product, useful for sound and thermal insulation. The foaming components may also be pumped into a large mold to expand and harden into a cellular solid product. The cellular solid product may be sawed into slabs and used for insulation in houses, boats, vehicles, airplanes, etc. The cellular product may also be chopped by a suitable machine into particles and poured or blown into places such as ceilings, walls, etc., and be used for thermal and sound insulation. The cellular product may also be used as a molding powder and molded into useful products by heat and pressure in a mold.

The alkali metal-cellulose-silicate condensation product as produced in this invention may be pre-reacted with a phenol compound and an aldehyde to produce a liquid condensation product. This liquid condensation product may be foamed by the addition of an acid compound in the same manner as the amino-aldehyde-cellulose-silicate condensation product and may be used for the same purposes, sound and thermal insulation. The phenol-aldehyde-cellulose-silicate condensation product may be used as a molding powder, and in the production of paints, varnishes, adhesives, etc. The liquid phenol-aldehyde-alkali metal-cellulose-silicate condensation product may be poured into a mold, then heated for 1 to 6 hours at 60° C. to 90° C., thereby producing a tough, solid, useful product.

The alkali metal-cellulose-silicate condensation product as produced in this invention may be pre-reacted with a phenol compound, an amino compound and an aldehyde compound so as to produce a liquid resin. This liquid resin may be poured into a mold, then heated to 70° C. to 100° C. for 1 to 6 hours, thereby producing a tough, solid, useful product. This liquid resin may also be foamed on the job by adding the liquid resin and an acid compound (catalyst) simultaneously to a mixing chamber, then rapidly pumping or using air pressure to transfer the foaming mixture into a mold such as walls, ceilings, etc., where it rapidly sets within a few seconds to several minutes into a tough, rigid, somewhat elastic, cellular solid product, optionally containing a blowing agent, emulsifier, foam stabilizer, filler, flame-retardant agents and other additives. The product has good sound- and thermal-insulation qualities, good flame-retardant properties and good dimentional stability. The phenoplast-aminoplast-cellulose-silicate resins may be used as molding powder and be molded by heat and pressure into useful objects. The phenoplast-aminoplast-cellulose-silicate resins may be foamed into large slabs, then sawed into various sizes and thicknesses or broken into small particles and used for thermal and sound insulation in houses, buildings, vehicles and aircrafts; these large slabs of foam may be sawed into various thicknesses and widths, then a moisture barrier such as aluminum foil may be applied by the use of an adhesive to produce an insulation material that has excellent flame-resistant properties, good strength and excellent thermal and sound insulation qualities.

The process according to the invention to produce the polyisocyanate-cellulose-silicate foam and polyurethane-cellulose-silicate foam is particularly suitable, however, for in situ foaming on the building site. Any hollow molds normally produced by shuttering in forms can be used for casting and foaming. The reaction mixture, optionally containing a blowing agent, emulsifier, foam stabilizer, filler, flame-retardant agent, diluents, dodorants, coloring agents and other agents, produced by adding the components simultaneously to a mixing apparatus, is immediately pumped or sprayed by compressed air into a mold, e.g., walls, ceilings, cold or heated relief molds, solid molds, hollow molds, etc., where it may be left to harden. The foaming reaction mixture may also be forced, cast or injection molded into cold or heated molds, then hardened, optionally under pressure and at room temperature or at temperatures up to 200° C., optionally using a centrifugal casting process. At this stage reinforcing elements in the form of inorganic and/or organic or metal wires, fibers, non-woven webs, foams, fabrics, supporting structures, etc., may be incorporated in the foaming mixtures. This may be achieved, for example, by the fibrous-web-impregnation process or by processes in which the reaction mixtures and reinforcing fibers are applied together to the mold, for example, by means of a spray apparatus. The molded products obtained in this way may be used as building elements, e.g., in the form of optionally foamed sandwich elements which may be subsequently laminated with metal, glass, plastics, etc. The fire characteristics of the material are good, but are improved by the addition of flame-retardant agents. On the other hand, the products may be used as hollow bodies, e.g., as containers for goods which are required to be kept moist or cool, or the hollow bodies may be used as filter materials or exchanges, as catalyst carriers or as carriers of other active substances, as decoration elements, shock-resistant packaging, furniture components and cavity fillings. They may also be used in the production of molds for metal casting and in model building. The cellular products may also be produced by pouring the components into a mold, then mixing well, after which the mixture expands, then hardens in the mold. The mold may be in the form of a large slab so that it can be cut into various sizes, shapes and thicknesses as desired. The reaction mixtures may also be foamed up and hardened while in the form of droplets or may be dispersed, e.g., in petroleum hydrocarbons or while they are under condition of free fall. The foamed products produced by these methods may also be added in a crumbly form to soil, optionally with the addition of fertilizers and plant-protective agents so as to improve the agricultural consistency of the soil. Foams which have a high water content may be used as substrates for the propagation of seedlings, shoots and plants or for cut flowers. The mixtures may be sprayed on terrain which is impossible or too loose, such as dunes or marshes, to strengthen such terrain so that it will be firm enough to walk on within a short time, and will be protected against erosion. The foaming mixtures may also be used underground in caves, mines, tunnels, etc., by spraying the foaming mixture onto wire mesh, fiberglass cloth, woven fabrics or directly on the walls, to produce protective layers to prevent cave-ins.

It is also possible to introduce into the foaming reaction mixtures, providing they are still free-flowing, inorganic and/or organic foamable or already foamed particles such as expanded clay, expanded glass, wood, popcorn, cork, hollow beads of plastics, for example, vinyl chloride polymers, polyethylene, styrene polymers or foam particles thereof or even, for example, polysulphone, polyepoxides, polyurethane, ureaformaldehyde, phenol formaldehyde, polyimide polymers, or the reaction mixtures may be allowed to foam through interstitial space in packed volumes of these particles, and in this way to produce insulating materials which are distinguished by excellent flame behavior. Combinations of expanded clay, glass, or slate with the reaction mixtures, according to the invention, are especially preferred.

Most of these polyisocyanate-cellulose-silicate and polyurethane-cellulose-silicate cellular solid products are soluble in certain organic solvents and may be utilized as paints, varnishes, adhesives, fillers, caulking materials, etc.

The object of the present invention is to provide a novel process to produce alkali metal-cellulose-silicate polymers from cellulose-containing plants, alkali metal hydroxides and oxidated silicon compounds. Another object is to produce novel alkali metal-cellulose-silicate condensation products which are highly reactive and are water-soluble. Still another object is to pioduce novel alkali metal-cellulose-silicate which will produce a gas, $CO_2$, when reacted with an acid compound, thereby producing a foamed cellulose-silicate foamed product. Another object is to produce novel solid cellulose-silicate condensation products. Still another object is to produce alkali metal-cellulose-silicate condensation product which will react chemically with aldehydes to produce novel aldehyde-cellulose-silicate solid or cellular solid products. Another object is to produce novel alkali metal-cellulose-silicate condensation product that will react with aldehyde and amine compounds to produce novel aminoplast-cellulose-silicate resins and foams. Another object is to produce alkali metal-cellulose-silicate condensation products that will react with aldehyde compounds and phenol compounds to produce novel phenoplast-cellulose-silicate resins and foams. Another object is to produce alkali metal-cellulose-silicate condensation products that will react with polyisocyanate compounds and polyurethane prepolymers to produce novel resins and cellular product.

DESCRIPTION OF PREFERRED EMBODIMENTS

My invention will be illustrated in greater detail by the specific examples which follow, it being understood that these preferred embodiments are illustrative of, but not limited to, procedures which may be used in the production of alkali metal-cellulose-silicate condensation products. Parts and percentages are by weight unless otherwise indicated.

EXAMPLE 1

About 1 part by weight of hydrated silica, 2 parts by weight of fir sawdust and 2 parts by weight of sodium hydroxide flakes are mixed, then heated to 150° C. to 220° C. while agitating at ambient pressure, with care being taken to avoid burning the mixture, for 5 to 60 minutes or until the mixture softens and expands into a dark-brown, thick liquid which solidifies on cooling, thereby producing an alkali metal-cellulose-silicate (sodium-cellulose-silicate) condensation product. The product is soluble in water, alcohols, polyhydroxyl compound and other organic solvents.

EXAMPLE 2

About 1 part by weight of silica, 1 part by weight of dry pine sawdust and 2 parts by weight of granular sodium hydroxide are mixed, then heated to about 150° C. while agitating for about 5 minutes; the mixture begins to expand, and on continued heating between 180° C. to 220° C., a dark-brown, thick liquid, sodium-cellulose-silicate condensation product, is produced. The liquid solidifies on cooling. The product is soluble in water.

EXAMPLE 3

About 1 part by weight of silica sol, 2 parts by weight of white oak sawdust and 2 parts by weight of sodium hydroxide flakes are mixed, then heated to 150° C. to 220° C. while agitating at ambient pressure for 5 to 60 minutes or until all the sawdust softens and expands into a thick liquid, thereby producing sodium-cellulose-silicate condensation product.

EXAMPLE 4

About 2 parts by weight of fine particles of various woods listed below, 2 parts by weight of potassium hydroxide and 0.5 part by weight of silica are mixed, then heated to 150° C. to 220° C. while agitating at ambient pressure for 5 to 60 minutes, thereby producing potassium-cellulose-silicate condensation product.

The wood is selected from the group consisting of fir, pine, redwood, cedar, oak, spruce, gum, hemlock, walnut, hickory, eucalyptus, birch, poplar, beech, maple, mahogany, aspen, ash, cypress, elm, cherry, sycamore and mixtures thereof.

EXAMPLE 5

About 3 parts by weight of sodium hydroxide flakes, 3 parts by weight of cotton and 1 part by weight of hydrated silica are mixed, then heated to 150° C. to 220° C. while agitating at ambient pressure for 5 to 60 minutes, thereby producing sodium-cellulose-silicate condensation product.

Other cellulose products may be used in place of cotton, such as wood pulp with lignin removed by soda process or by the acid sulfite process, wood pulp from waste paper and mixtures thereof.

EXAMPLE 6

About 2 parts by weight of sodium hydroxide flakes, 2 parts by weight of dried particles of seaweed, and 1 part by weight of fine granular silica are mixed, then heated to 150° C. to 220° C. while agitating for 5 to 60 minutes, thereby producing a water-soluble mixture of sodium alginate silicate and sodium cellulose silicate with the alginic acid still attached to the cellulose.

Dried seaweed particles with the alginic acid extracted with an alkali carbonate such as sodium carbonate may be used in place of seaweed (kelp).

EXAMPLE 7

About 1 part by weight of sodium hydroxide, 1 part by weight of dry granular sodium silicate and 2 parts by weight of dry particles of kelp are mixed, then heated to 150° C. to 220° C. while agitating for 5 to 60 minutes at ambient pressure, thereby producing sodium alginate-cellulose-silicate condensation product.

EXAMPLE 8

About 3 parts by weight of sodium hydroxide, 1 part by weight of dried kelp particles, 1 part by weight of fir sawdust and 1 part by weight of fine granular silicoformic acid (hydrated silica containing Si-H bonds) are mixed, then heated to 150° C. to 220° C. while agitating for 5 to 60 minutes, thereby producing sodium alginate-cellulose-silicate condensation product.

EXAMPLE 9

About 3 parts by weight of dry corn cobs ground into small particles about the size of sawdust, 3 parts by weight of potassium hydroxide pellets and 1 part by weight of hydrated silica are mixed, then heated to 150° C. to 220° C. while agitating for 5 to 60 minutes, thereby producing a water-soluble, dark-brown sodium-cellulose-silicate condensation product.

Other agricultural cellulose-containing plants may be used in place of corn cobs, such as corn stalks, soybean stalks, cane sugar stalks (bagasse), pea vines and stalks, bean vines and stalks, cotton stalks, rice straw, wheat straw, oat straw, barley straw, soybean stalks, sugar beet waste, sorghum stalks, maize stalks, tobacco stalks, buckwheat stalks, etc., and mixtures thereof.

EXAMPLE 10

About 3 parts by weight of sodium hydroxide, 1 part by weight of sawdust from spruce wood, 1 part by weight of chopped dry seaweed, 1 part by weight of ground cotton stalks and 1 part by weight of hydrated silica are mixed, then heated to 150° C. to 220° C. while agitating for 5 to 60 minutes, thereby producing sodium alginate-cellulose-silicate condensation product.

EXAMPLE 11

About 2 parts by weight of sodium hydroxide flakes, 2 parts by weight of dried algae and 1 part by weight of hydrated silica are mixed, then heated to 150° C. to 220° C. while agitating for 5 to 60 minutes, thereby producing sodium-hemicellulose-silicate condensation product.

EXAMPLE 12

About 4 parts by weight of the sodium-cellulose-silicate condensation product, as produced in Example 1, are added to 6 parts by weight of water, then filtered. About 0.1 part by weight of the weight of the wood is filtered out. To the aqueous solution of sodium-cellulose-silicate condensation product is added hydrochloric acid until the pH is about 7; $CO_2$ is given off and cellulose-silicate condensation product is precipitated out. The aqueous solution is filtered off, thereby recovering the cellulose-silicate product. The aqueous solution is evaporated and contains salt and about 0.2 part by weight of lignin silicate and cellulose.

EXAMPLE 13

About 3 parts by weight of sodium hydroxide flakes, 2 parts by weight of dried ground garden plants, containing about equal parts by weight of tomato plants, bean plants, pea plants, pea vines, potato plants, grass and weeds, and 1 part by weight of silica, fine granular, are mixed, then heated to 150° C. to 220° C. while agitating for 5 to 60 minutes, thereby producing sodium-cellulose-silicate condensation product.

EXAMPLE 14

About 3 parts by weight of sodium hydroxide flakes, 1 part by weight of pine wood sawdust, 1 part by weight of dry algae, 1 part by weight of Johnson grass and 1 part by weight of hydrated silica are mixed, then heated to 150° C. to 220° C. while agitating for 5 to 60 minutes, thereby producing sodium-cellulose-silicate condensation product.

EXAMPLE 15

About 4 parts by weight of the sodium-cellulose-silicate condensation product as produced in Example 1 are mixed with water containing 50% sodium hydrogen sulfate by weight to produce a pH of about 7. The mixture expands 3 to 4 times its original volume to produce a cellular solid cellulose-silicate condensation product. The sodium sulfate is removed by washing and filtering.

EXAMPLE 16

About 4 parts by weight of the sodium-cellulose-silicate, as produced in Example 2, are mixed with 8 parts by weight of water. The sodium-cellulose-silicate aqueous solution is filtered, and very little is not water-soluble. Dilute sulfuric is added to the aqueous solution until the pH is 6 to 7; carbon dioxide evolves, and the cellulose-silicate product is precipitated. The water is filtered off, then evaporated, and about 0.25 parts by weight of the cellulose-silicate and lignin is recovered.

EXAMPLE 17

About 4 parts by weight of the sodium-cellulose-silicate condensation product, as produced in Example 1, are mixed with 6 parts by weight of an aqueous solution containing 37% formaldehyde, then heated to 70° C. to 100° C. while agitating for 10 to 120 minutes, thereby producing a formaldehyde-sodium-cellulose-silicate copolymer.

EXAMPLE 18

About 4 parts by weight of the formaldehyde-sodium-cellulose-silicate copolymer, as produced in Example 17, are mixed with phosphoric acid until the pH is about 6 to 7; the mixture expands 3 to 6 times its original volume, thereby producing an aldehyde-cellulose-silicate cellular solid product.

EXAMPLE 19

About 3 parts by weight of the sodium-cellulose-silicate condensation product, as produced in Example 3, and 2 parts by weight of furfural are mixed, then agitated at ambient temperature for 10 to 120 minutes, thereby producing an aldehyde-sodium-cellulose-silicate copolymer.

Other aldehydes may be used in place of furfural such as formaldehyde, acetaldehyde, propionaldehyde, crotonaldehyde, acrolein, butyl aldehyde, pentanals, hexanals, heptanals, octanals, and mixtures thereof.

EXAMPLE 20

To about 3 parts by weight of each of the aldehyde-sodium-cellulose-silicate copolymers produced in Example 19 is added an acid compound, hydrochloric acid, until the pH is 6 to 7. The mixture expands 3 to 6 times its original volume, thereby producing a cellular solid aldehyde-cellulose-silicate product.

Other acid compounds may be used in place of hydrochloric acid such as mineral acids, organic acids, inorganic hydrogen-containing salts and mixtures thereof.

EXAMPLE 21

2 parts by weight of the sodium-cellulose-silicate condensation product, as produced in Example 2, 1 part by weight of urea and 3 mols of an aqueous solution containing 37% formaldehyde for each mol of urea are mixed, then agitated at a temperature between ambient temperature and 100° C. for 10 minutes to 12 hours, thereby producing an aminoplast-sodium-cellulose-silicate resin.

EXAMPLE 22

To about 2 parts by weight of the aminoplast-sodium-cellulose-silicate resin, as produced in Example 21, are added a mixture of about equal mols of hydrochloric acid and phosphoric acid until the pH is 5 to 7, while vigorously agitating; the mixture expands 3 to 10 times it original volume, thereby producing a rigid cellular solid aminoplast-cellulose-silicate product.

EXAMPLE 23

2 parts by weight of the sodium-cellular-silicate condensation product, as produced in Example 1, 1 part by weight of the sodium alginate-cellulose-silicate, as produced in Example 7, 2 parts by weight of an amino compound, selected from the list below, and 5 mols of an aldehyde for each mol of the amino compound, selected from the list below, are mixed, then agitated at a temperature between ambient temperature and 100° C. for 10 minutes to 12 hours, thereby producing an aminoplast-alkali-cellulose-silicate resin.

| Example | Amino compound | Aldehyde |
|---|---|---|
| A | urea | acetaldehyde |
| b | thiourea | propionaldehyde |
| c | melamine | crotonaldehyde |
| d | 1,3-dibutylthiourea | furfural |
| e | 1,3-dibutylurea | acrolein |
| f | ethylenediamine | butyl aldehyde |
| g | propylenediamine | benzaldehyde |
| h | diethylenetriamine | formaldehyde |
| i | 1,3-dipropylurea | paraformaldehyde |
| j | aniline | formaldehyde |

EXAMPLE 24

To about 2 parts by weight of each of the aminoplast-alkali metal-cellulose-silicate resins, produced in Example 23, is added an acid compound, hydrochloric acid, until the pH is 6 to 7, while rapidly mixing. The mixture expands 3 to 10 times its original volume, thereby producing cream-colored, cellular solid amino-plastic-cellulose-silicate products.

Other acid compounds may be used in place of hydrochloric acid such as other mineral acids, organic acids, salt-producing organic compounds, inorganic hydrogen-containing salts and mixtures thereof.

EXAMPLE 25

About 2 parts by weight of an alkali metal-cellulose-silicate condensation product listed below, 1 part by weight of a phenol compound listed below, and 3 mols of an aqueous solution of formaldehyde for each mol of the phenol compound are mixed, then agitated at a temperature between ambient and 100° C. for 10 minutes to 12 hours, thereby producing a phenoplast-alkali metal-cellulose-silicate resin.

| Example | Alkali-metal-cellulose-silicate | Phenol compound |
|---|---|---|
| a | of Example 1 | phenol |
| b | of Example 2 | cresol |
| c | of Example 3 | creosote |
| d | of Example 4 | p-cresol |
| e | of Example 5 | o-cresol |
| f | of Example 6 | m-cresol |
| g | of Example 7 | cresylic acid |
| h | of Example 8 | resorcinol |
| i | of Example 9 | cashew nut shell liquid |
| j | of Example 10 | Bisphenol A |
| k | of Example 11 | 2,6-dimethylphenol |
| l | of Example 13 | p-tert-butyl phenol |

EXAMPLE 26

To each of the phenoplast-alkali metal-cellulose-silicate resins, produced in Example 25, is added an acid compound, phosphoric acid, until the pH is 6 to 7 while rapidly mixing. The mixture expands 3 to 12 times its original volume, thereby producing a cellular solid phenoplast-cellulose-silicate product.

EXAMPLE 27

Example 25 is modified, wherein 1 part by weight of urea is added to the phenol compound, thereby producing an aminoplast-phenoplast-alkali metal-cellulose-silicate resin; then in Example 26, a light-brown-colored, cellular solid aminoplast-phenoplast-cellulose product is produced.

EXAMPLE 28

About 2 parts by weight of the sodium-cellulose-silicate condensation product, as produced in Example 1, 2 parts by weight of urea, 0.5 part by weight of cresylic acid and 3 mols of an aqueous solution of formaldehyde for each mol of urea and cresylic acid are mixed at 50° C.; then 0.5 part by weight of chloroform and sufficient hydrochloric acid are added to produce a pH of 6 to 7 while rapidly mixing. The mixture expands 3 to 10 times its original volume, thereby producing a light-brown, rigid, tough, cellular solid aminoplast-phenoplast-cellulose product.

EXAMPLE 29

About 2 parts by weight of an alkali metal-cellulose-silicate condensation product, as produced in Example 1, and 1 part by weight of tolylene diisocyanate are mixed, then agitated for 10 to 60 minutes at a temperature between 20° C. to 70° C., thereby producing a polyisocyanate-alkali metal-cellulose-silicate prepolymer. Then 0.4 part by weight of water containing 5% by weight of triethylamine and 10% by weight of a stabilizer (polyether polysiloxane silicate as produced by the process of U.S. Pat. No. 4,120,937) are added to the prepolymer while agitating for 5 to 20 minutes or until the mixture begins to expand. It expands 3 to 10 times its original volume, thereby producing a light-brown-colored, tough, cellular solid polyisocyanate-cellulose-silicate product.

Other alkali metal-cellulose-silicate polymers may be used in place of that produced in Example 1, such as those produced in Examples 2, 3, 4, 5, 6, 7, 8, 9, 10, 11, 13 and 14 and mixtures thereof.

Other curing agents may be used in place of water containing 5% by weight of triethylamine, water containing 1% to 10% by weight of other amine catalysts, water containing 10% to 60% by weight of a polyhydroxy compound, water containing 10% to 60% by weight of silica sol, water containing up to 5% by weight of an emulsifying agent, water containing 10% to 50% by weight of sodium silicate, and water containing 1% to 10% by weight of an inorganic amine compound as produced by U.S. Pat. No. 4100112.

EXAMPLE 30

About 2 parts by weight of a powdered alkali metal-cellulose-silicate condensation product, as listed below, 2 parts by weight of a polyol, listed below, and 2 parts by weight of tolylene diisocyanate (80% of 2,4-isomer and 20% of 2,6-isomer) are added simultaneously at ambient temperature and pressure, then rapidly mixed. In a few seconds to 10 minutes, the mixture expands about 8 to 12 times its original volume to produce a rigid, tough, cream-to-brown-colored, cellular solid polyurethane cellulose silicate product.

| Example | Alkali metal-cellulose-silicate | Polyol |
|---|---|---|
| a | as produced in Example 1 | glycerol |
| b | as produced in Example 2 | triethylene glycol |
| c | as produced in Example 3 | propylene glycol |
| d | as produced in Example 4 | butylene glycol |
| e | as produced in Example 5 | polyethylene glycol (mol. wt. 480) |
| f | as produced in Example 6 | polypropylene glycol (mol. wt. 500) |
| g | as produced in Example 7 | polyethylene glycol (mol. wt. 1000) |
| h | as produced in Example 8 | polyethylene glycol |

| Example | Alkali metal-cellulose-silicate | Polyol |
|---|---|---|
| i | as produced in Example 9 | (mol. wt. 1500) polyester (3.8 mols glycerol, 2.5 mols adipic acid and 0.5 mol phthalic acid) |
| j | as produced in Example 10 | polyester (16 mols of adipic acid, 16 mols of diethylene glycol and 1 mol of trimethylol propane) |
| k | as produced in Example 11 | polyether (polyepichlorohydrin, mol. wt. 530) |
| l | as produced in Example 13 | liquid hydroxyl-terminated polybutadiene having 20% pendant vinyl groups (Poly B-D R45M, Arco Chemical Co.) |
| m | as produced in Example 14 | liquid polysulfide polymer containing hydroxyl groups |
| n | as produced in Example 3 | castor oil |

EXAMPLE 31

The procedure in Example 30 is modified wherein the alkali metal-cellulose-silicate condensation product is first mixed with the polyol before the polyisocyanate is added.

EXAMPLE 32

About 2 parts by weight of the powdered potassium-cellulose-silicate condensation product, as produced in Example 4, using fir wood, 2 parts by weight of powdered sodium alginate-cellulose-silicate condensation product, as produced in Example 10, and 4 parts by weight of an isocyanate-terminated polyurethane prepolymer, listed below, are thoroughly mixed at ambient temperature to 70° C.; then in a few seconds to about 10 minutes, the mixture begins to expand, expanding 3 to 12 times its original volume to produce a tough, rigid, cellular solid polyurethane-cellulose-silicate product.

| Example | Isocyanate-terminated polyurethane prepolymer |
|---|---|
| a | toluene diisocyanate with polypropylene glycol (mol. wt. 500) in an NCO/OH ratio of 25:1. |
| b | 20% solution of a distillation residue of the distillation of commercial tolylene diisocyanate in a crude phosgenation product of an aniline-formaldehyde condensation with an NCO content of about 30%, with polyethylene glycol (mol. wt. 1000) to produce an isocyanate-terminated prepolymer with an NCO content of about 17%. |
| c | diisocyanatodiphenylmethane with a tetrafunctional polypropylene glycol (mol. wt. 500) to produce a prepolymer having about 22% NCO groups. |
| d | toluene diisocyanate with a liquid hydroxyl-terminated polybutadiene (mol. wt. about 1000) available from Arco Chemical Co. under the trade designation of "POLY B-D R-15M" and "POLY B-D R45M" to produce a prepolymer with an NCO content of about 7%. |
| e | toluene diisocyanate with castor oil to produce a prepolymer with an NCO content of about 15%. |
| f | toluene diisocyanate with a hydroxyl-group-containing polysulfide polymer to produce a prepolymer with an NCO content of about 12%. |
| g | methylene bis-phenyl diisocyanate with a liquid polyepichlorohydrin to produce a prepolymer of about 16% and 25% by weight of a resin extender, polyalphamethyl-styrene are added, percentage based on weight of prepolymer. |
| h | residue of tolylene diisocyanate distillation with about 20% by weight of NCO with polyethylene glycol (mol. wt. 1500) to produce a prepolymer with an NCO content of about 11%. |
| i | tolylene diisocyanate with a polyester (4 mols of glycerol, 2.5 mols of adipic acid and 0.5 mol of phthalic anhydride) to produce a prepolymer with an NCO content of about 23%. |
| j | tolylene diisocyanate with polyethylene (mol. wt. 2000) to produce a prepolymer with an NCO content of about 28%. |

EXAMPLE 33

About 2 parts by weight of sodium-cellulose-silicate condensation product, as produced in Example 2, are mixed with 2 parts by weight of water to produce a thick aqueous solution which is then mixed thoroughly with 0.01 part by weight of triethyleneamine and 3 parts by weight of tolylene diisocyanate. The mixture begins to expand in 1 to 20 minutes. It expands 3 to 10 times its original volume, thereby producing a rigid, cellular solid, polyisocyanate-silicate product.

EXAMPLE 34

About 4 parts by weight of sodium-cellulose-silicate condensation product, as produced in Example 1, are mixed in 5 parts by weight of water, 0.02 part by weight of triethanolamine, 0.05 part by weight of sodium dioctyl sulfosuccinate and 0.1 part by weight of trichlorofluoromethane, then thoroughly mixed with an organic polyisocyanate, listed below. The mixture expands 3 to 10 times its original volume, thereby producing a rigid, cellular solid polyisocyanate-silicate product.

The polyisocyanates used in this Example are: tolylene-2,4- and -2,6-diisocyanate and mixtures thereof, polyphenylpolymethylene-isocyanate, diisocyanatodiphenylmethane, methylene bis phenyl diisocyanate, residue of tolylene diisocyanate with about 20% by weight of NCO, metaphenylene, sulphonated polyphenylpolymethylene-polyisocyanate (sulphur content: about 1%, isocyanate content: 30%) and 20% solution of a distillation residue of the distillation of commercial tolylene diisocyanate in diisocyantodiphenylamine.

EXAMPLE 35

Example 32 is modified, wherein water is added to the alkali metal-cellulose-silicate condensation product to produce an aqueous solution containing 50% by weight of alkali metal-cellulose-silicate thereby producing polyurethane-cellulose-silicate cellular solid products.

EXAMPLE 36

An aqueous solution containing 60% sodium-cellulose-silicate condensation product, as produced in Example 1, and 1% by weight of triethylamine are mixed with an isocyanate-terminated polyurethane prepolymer, which was produced by reacting tolylene diisocyanate with polyethylene (mol. wt. 1000), in the ratio of 3 parts by weight of the aqueous solution to 5 parts by weight of the prepolymer. The mixture expands to 3 to 10 times the original volume, thereby producing a tough, rigid, cellular solid polyurethane-cellulose-silicate product.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of polyurethane-cellulose-silicate cellular solid or solid product by the following steps:
    (a) mixing 3 parts by weight of a cellulose-containing plant with 1 to 2 parts by weight of an oxidated silicon compound and 2 to 5 parts by weight of an alkali metal hydroxide,
    (b) heating the mixture at 150° C. to 220° C. while agitating for 5 to 60 minutes, thereby
    (c) producing a water-soluble alkali metal-cellulose-silicate condensation product;
    adding water to produce 10 parts by weight of an aqueous solution, containing 20% to 60% by weight of the alkali metal-cellulose-silicate condensation product, then
    (e) mixing the aqueous alkali metal-cellulose-silicate solution with 10 to 100 parts by weight of an isocyanate-terminated polyurethane prepolymer and 0.001 to 0.01 parts by weight of an amine allowed to react, thereby
    (f) producing a polyurethane-cellulose-silicate solid or solid product.

2. The product produced by the process of claim 1.

3. The process of claim 1 wherein the isocyanate-terminated polyurethane prepolymer is selected from the group consisting of an isocyanate-terminated polyester, isocyanate-terminated polyether, isocyanate-terminated polybutadiene, isocyanate-terminated polysulfide and mixtures thereof.

4. The process of claim 1 wherein the alkali metal hydroxide is selected from the group consisting of sodium hydroxide, potassium hydroxide and mixtures thereof.

5. The process of claim 1 wherein the oxidated silicon compound is selected from silica, natural silicates containing free silicic acid radicals, sodium silicate, potassium silicate and mixtures thereof.

* * * * *